June 2, 1970  J. A. REGAL  3,515,173
SHIELDED SAFETY GAS MAIN ASSEMBLY
Filed Jan. 12, 1968  3 Sheets-Sheet 1
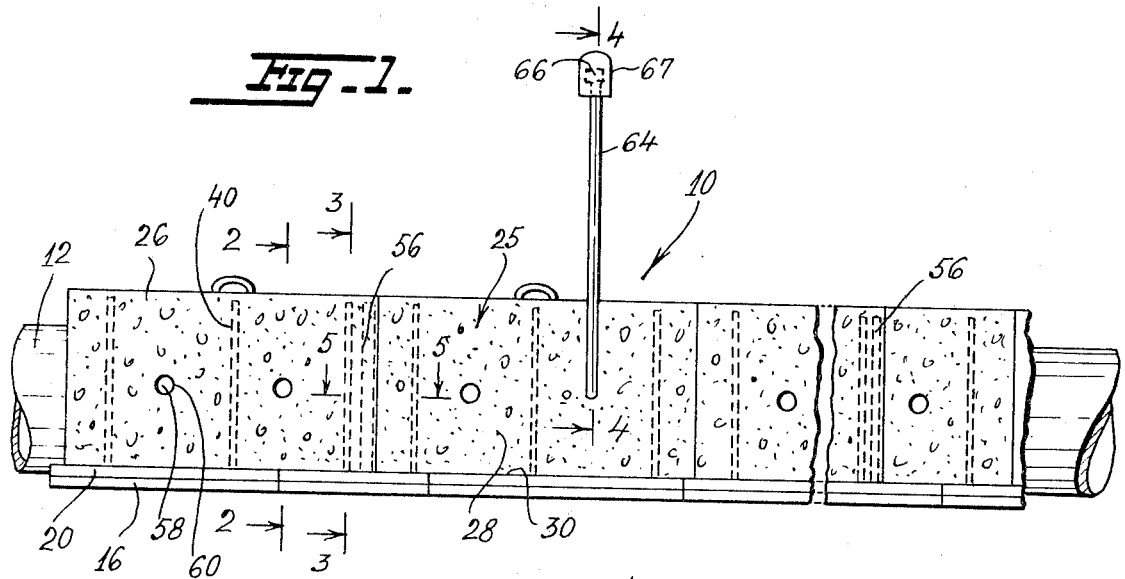
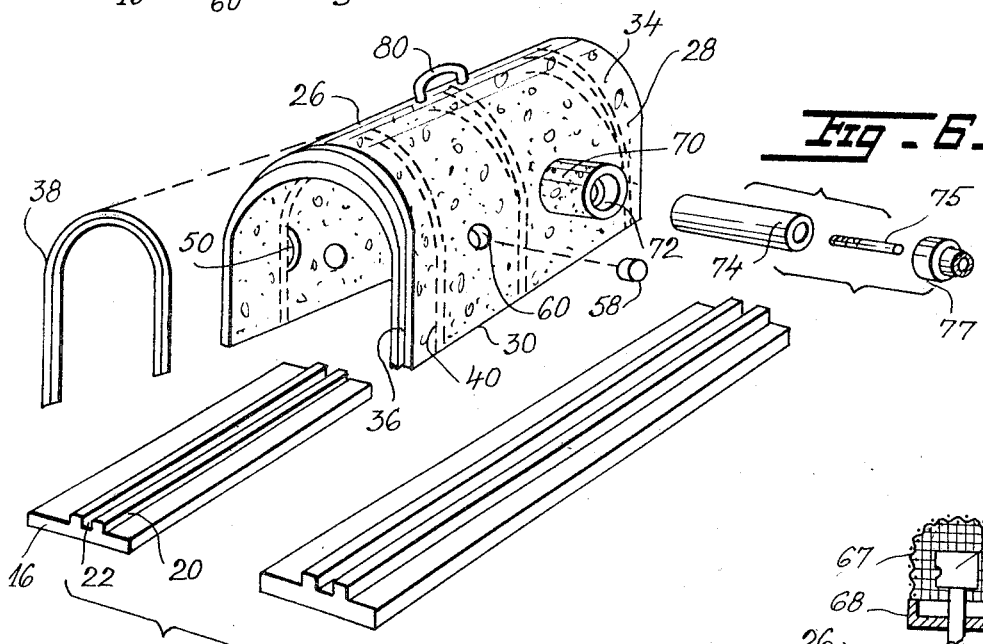
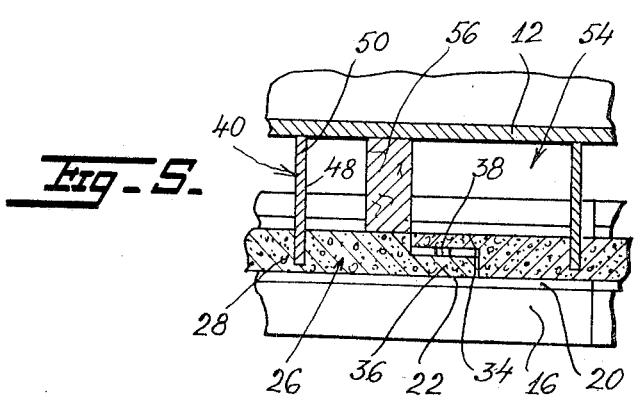
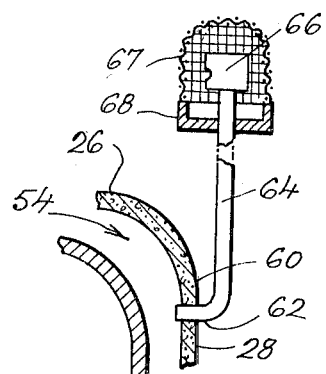
INVENTOR
John A. Regal
By Potachek & Saulsbury
ATTORNEYS

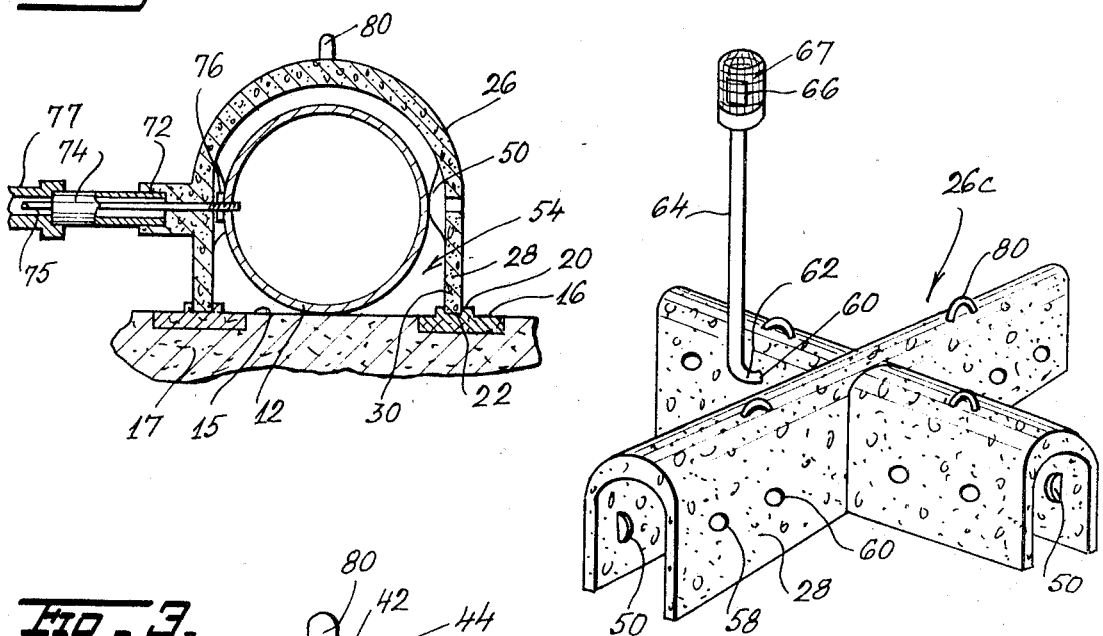
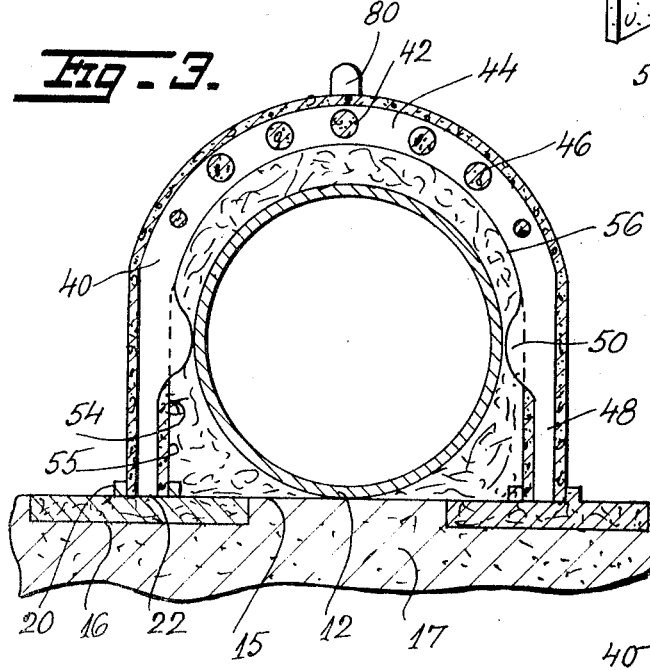
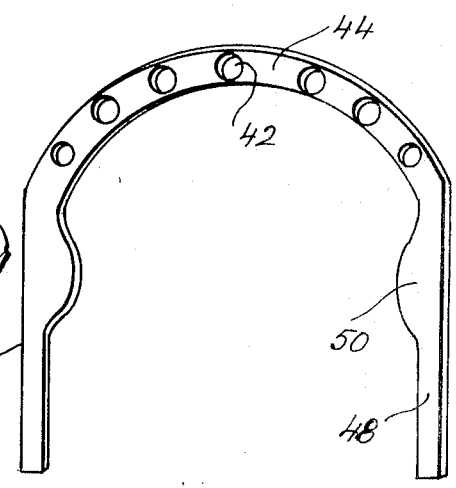

June 2, 1970   J. A. REGAL   3,515,173
SHIELDED SAFETY GAS MAIN ASSEMBLY
Filed Jan. 12, 1968   3 Sheets-Sheet 3
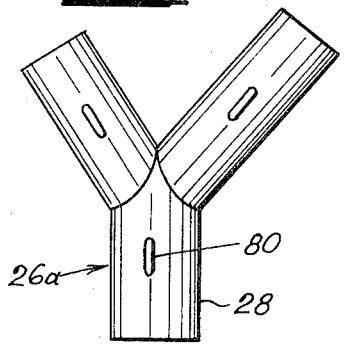
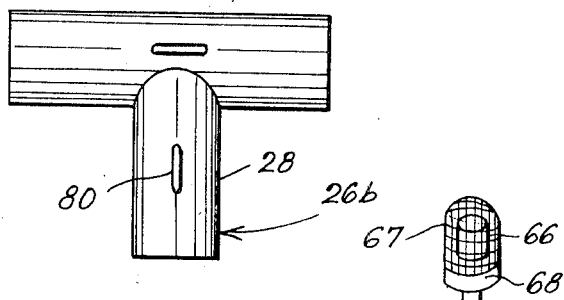
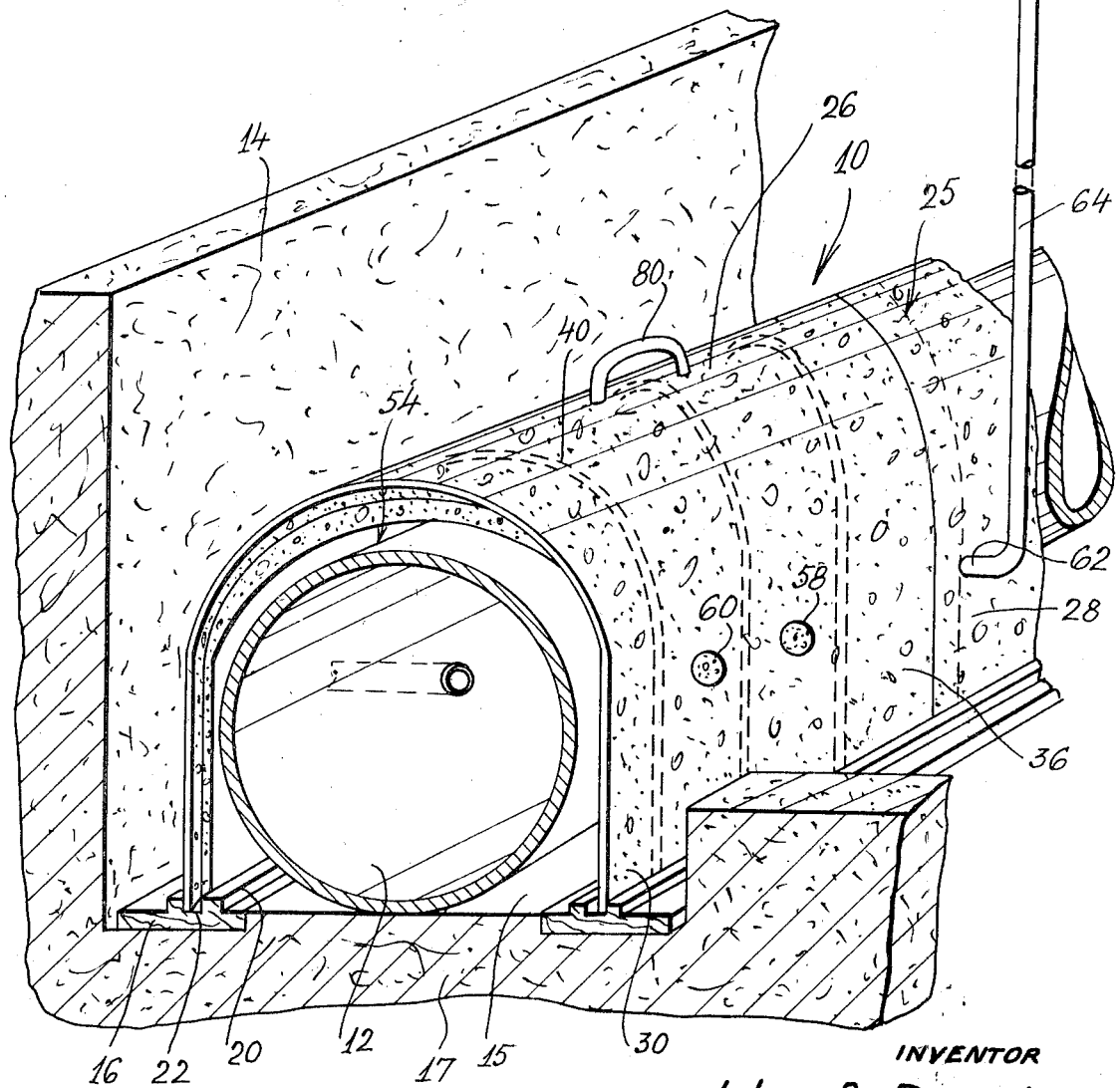
INVENTOR
John A. Regal
By Polachek & Saulsbury
ATTORNEYS United States Patent Office 3,515,173
Patented June 2, 1970

3,515,173
SHIELDED SAFETY GAS MAIN ASSEMBLY
John A. Regal, Box 139, R.D. 2, Rockaway Valley Road,
Boonton Township, N.J. 07005
Filed Jan. 12, 1968, Ser. No. 697,497
Int. Cl. F16l 55/00
U.S. Cl. 138—104        8 Claims

ABSTRACT OF THE DISCLOSURE

The disclosure describes a shielded safety gas main assembly in which a gas main located under the surface of a street or roadway is enclosed in a cast concrete shell. Fibrous pads inserted in the shell at intervals serve as gas stops or blocks in the event of gas leaks. Vent pipes inserted in knockout holes are extended up to the atmosphere. The vent pipes are provided with screens. They also have high pitch whistles operated at low gas velocities. The shells are reinforced by ribs which provide passages for leaking gas. Shells are prefabricated in short lengths and interfitted at their ends with sealing strips.

---

The invention concerns an improved shielded gas main assembly.

Heretofore, it has been conventional to install gas mains particularly those conducting fuel gas under pressure, inside of protective conduits of larger diameter. The installation of gas main protected by a surrounding cylindrical sleeve underground is very expensive, laborious and time consuming. The gas main and sleeve are installed in sections. As each section of the gas main is joined to the next one, a section of the outer sleeve must also be installed and joined. The work proceeds very slowly and must be done very carefully by highly skilled artisans. If a leak develops in the gas main, location of the point of leakage is very difficult since the gas main is inside the outer protective sleeve. After the leak is located, repair is difficult because the protective sleeve must be broken open to reach the defective main, and then sections of the gas main and sleeve must be replaced.

The present invention is directed at avoiding these difficulties and disadvantages and has as its principal object providing a shielded gas main in which the shield comprises a series of U-shaped shells made of precast concrete. The shells can be made in various sizes and shapes, such as T's, elbows, crosses and the like to expedite installation. The shells do not surround the gas main completely so that they can be placed over the gas main after the gas main is installed in a trench below the ground surface level. The shells are interfitted end to end with sealing strips made of packing material. At intervals, the spaces between the shells and gas main are filled with fibrous pads to serve as gas stops or blocks. Between each pair of gas blocks is a vent pipe opening to the atmosphere. The vent pipe also has a whistle which emits a high pitched sound when leaking gas at low velocity passes through it. Steel reinforcing ribs are provided at spaced intervals in each shell. These ribs keep the sides of the shells spaced from the gas main and maintain free passages for leaking gas to reach the vent pipes.

For further comprehension of the invention and of the objects, and advantages thereof, reference will be had to the appended claims in which the various novel features of the invention are more particularly set forth.

In the accompanying drawings forming a material part of this disclosure:

FIG. 1 is a side view with parts broken away of a shielded safety gas main assembly embodying the invention.

FIG. 2 is a cross sectional view taken on line 2—2 of FIG. 1.

FIG. 3 is an enlarged cross sectional view taken on line 3—3 of FIG. 1.

FIG. 4 is a fragmentary enlarged sectional view taken on line 4—4 of FIG. 1, parts being broken away.

FIG. 5 is another fragmentary enlarged sectional view taken on line 5—5 of FIG. 1.

FIG. 6 is an exploded perspective view of parts of the shielded gas main assembly.

FIG. 7 is a perspective view of a reinforcing rib employed by the shielded gas main assembly.

FIG. 8 is a perspective view partially in section and with parts broken away of a shielded gas main assembly shown in a trench underground.

FIG. 9 and FIG. 10 are reduced plan views of other shell forms, underground, and FIG. 11 is a perspective view of a cross shaped shell.

Referring first to FIGS. 1 and 8, there is shown a shielded gas main assembly 10 in which is a cylindrical gas pipe 12 through which passes fuel gas under pressure. The pipe is shown installed in a trench 14 and rests on the surface 15 of earth 17. After installation of the assembly 10, the trench will be filled with earth and then a pavement can be laid over the filled trench. Along the surface 15 of the trench are two rows of concrete baseboards 16. These boards are of random lengths. The boards are formed with pairs of spaced rails 20 defining grooves 22 which extend the full lengths of the boards. The shield 25 is mounted on the boards. The shield is formed by a plurality of short shells 26. Each shell may be four feet long for example. Each shell has an inverted U-shaped cross section. Outer sides 28 of the shells are flat. Their free bottom ends 30 rest removably in the grooves 22 in the baseboards.

Each shell has a thinned flange end 34 which fits over the opposite thinned flanged end 36 of the adjacent shell. A resilient sealing strip 38 is interposed between the interfitted flanged ends 34, 36, to form a gas-tight joint; see FIG. 6. Each shell is made of precast concrete. Embedded in the body of each shell is a plurality of spaced U-shaped ribs 40; see FIGS. 3 and 7. Each rib has holes 42 formed in its bight 44 through which concrete keys 46 extend to lock the rib in the body of the shell. The planes of the ribs extend transversely of the longitudinal axes of the shells. Each leg 48 of the rib has an inwardly-extending flange 50. The flanges 50 contact the pipe 12 at diametrically opposite points and serve as spacer members to center the shells. These flanges do not materially block the free space or passage 54 surrounding the pipe 12 between its outer side and the interior surface 55 of the shells. Thus if any section of pipe 12 springs a gas leak the gas can flow into passages 54. At certain intervals of not more than 300 feet, a pad 56 of fibrous material such as rock wool, fiber glass or the like is installed around the pipe 12 to serve as a partition in passage 54. The pads serve as blocks or stops at the ends of compartments in shield 25; see FIGS. 3 and 5.

Each shell is formed with a plurality of knock-out plugs 58 in apertures 60. At least one of these plugs is removed in each section of shield 25 between two spaced pads 56. In the open aperture is inserted the bent end 62 of a vent pipe 64 which opens into passage 54. The body of the pipe extends vertically upward above the surface of the ground. At the upper end of the pipe 64 is fitted a whistle 66 of conventional type. This whistle emits a high pitched sound when leaking gas at low velocity passes through it. This provides an audible alarm indicating that the gas main is leaking and also indicating the section of the shield in which the leaking gas main section is located.

Certain ones of the shells, such as shell 26 shown in FIGS. 2 and 6 may have an integrally formed lateral branch nipple 70. Each nipple has an internal enlargement 72 which serves to receive a short line guard tube 74. A branch line 75 extends through the guard and nipple and is tapped into fitting 76 formed in the side of a section of pipe 12. The branch line 75 terminates at the premises of a consumer where gas meter and suitable gas consuming appliances are located. The line 75 will be further protected by a line guard 77 described in my prior U.S. Pat. No. 3,338,254 for "Safety Gas Connection Assembly," issued Aug. 29, 1967. The line guard 77 will be connected to guard tube 74 to close the compartment in the shield.

It will be apparent from the foregoing description, that the shield 25 can be installed over an existing gas main 12. Any leak which develops in the gas main will be localized in the passage 54 between two pads 56 and will pass out to the atmosphere through a vent pipe 64. There the gas can be detected by odor and by the audible alarm emitted by whistle 66.

The shells 26 can be axially curved rather than straight to accommodate the shield 12 to bends and turns in the gas pipe 12. Where branches of pipe 12 occur such Y's, T's and crosses the shells can be correspondingly shaped as shown by shells 26a, 26b and 26c in FIGS. 9, 10, and 11 to define passages around the branches into which leaking gas can enter. Pads such as pads 56 will be used to block the passages at spaced points. Vent pipes will be installed to open into the blocked passages. They will be inserted in knock-out holes 60 in the sides of the shells.

The assembly 10 is characterized by its ease and economy of installation. The shells 26 are precast, and if necessary can be cut to required lengths at the installation site. The shells rest on shock absorbing footings provided by the baseboards 16. These baseboards also serve as sealing members for passages 12 at the bottom of the shields. Any particular shell 26 can be removed if necessary to provide access to the gas main 12, and can then be replaced. Loops 80 can be embedded in the tops of the shells when they are cast, so that the shells can be easily, quickly and safely lifted by a crane.

If desired, the shells can be made of other moldable material than concrete, such as plastic or composition materials.

Where this system is used:

(1) Gas mains and branches are protected from ground shock waves, such as might be caused by missile, or thermonuclear bomb explosion.

(2) Gas pipe in a vented casing will remain in good condition for years, since it is not exposed to the corrosive action of the soil.

(3) Electrical isolation of every building's internal gas piping is provided by the plastic lined threaded aluminum coupling—see FIG. 3—item 34—prior U.S. Pat. No. 3,338,254 for "Safety Gas Connection Assembly" issued on Aug. 29, 1967.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A shielded safety gas main assembly, comprising a plurality of rigid shells made of cast material, each of said shells being interfitted end to end; sealing means at interfitted ends of the shells forming gas-tight joints thereat; a plurality of baseboards, said shells having spaced opposing walls and tops for defining passages around a gas main extensible longitudinally through the shells, a plurality of inverted U-shaped ribs embedded in each shell, said ribs being spaced apart longitudinally of the shell with planes of the ribs disposed transversely to the walls of the shell, each of said ribs having inwardly extending flanges formed on legs of the ribs for contacting the gas main at diametrically opposed points to center the shell with respect to the gas main.

2. A shielded safety gas main assembly as recited in claim 1, further comprising a gas main in the form of a cylindrical pipe extending longitudinally through the passages in the shells, a plurality of fibrous pads interposed between the gas main and inner sides of the shells at points spaced apart along the gas main and filling the passages at said points to define blocked off compartments for preventing any gas which leaks out of the main from flowing past the pads into adjacent compartments.

3. A safety gas main assembly as recited in claim 2, wherein each of said shells has spaced apertures in its walls closed by knock-out plugs, one of said plugs being knocked out of one aperture in one shell located between each pair of said pads, and a vent pipe connected to said one aperture opening into one of the blocked off compartments, and extending upwardly for venting to the atmosphere gas which has leaked out of the gas main into one of the compartments.

4. A safety gas main assembly as recited in claim 3, further comprising a whistle responsive to passage of gas therethrough at low velocity to emit a high pitched sound, said whistle being mounted at the upper open end of the vent pipe.

5. A safety gas main assembly as recited in claim 1, wherein at least one of said shells is Y-shaped in plan view.

6. A safety gas main assembly as recited in claim 1, wherein at least one of said shells is T-shaped in plan view.

7. A safety gas main assembly as recited in claim 1, wherein at least one of said shells is cross-shaped in plan view.

8. A safety gas main assembly as recited in claim 2, wherein at least one of said shells has a laterally-extending integrally formed nipple, a branch gas line extending through said nipple and connected to said gas main, and a gas line guard sleeve connected to the nipple.

References Cited

UNITED STATES PATENTS

| | | | |
|---|---|---|---|
| 381,653 | 4/1888 | Steel | 138—108 |
| 384,948 | 6/1888 | Young | 138—105 |
| 820,342 | 5/1906 | Besser | 138—157 |
| 894,120 | 7/1908 | Croy | 138—158 |
| 1,274,715 | 8/1918 | Hook et al. | 138—105 |
| 2,473,150 | 6/1949 | Kimbrough | 138—105 |
| 2,868,230 | 1/1959 | Stokes | 138—113 |
| 2,896,669 | 7/1959 | Broadway et al. | 138—113 |

LAVERNE D. GEIGER, Primary Examiner

H. K. ARTIS, Assistant Examiner

U.S. Cl. X.R.

138—105, 172, 174, 178